April 1, 1952     E. C. FILSTRUP, JR     2,591,528
PRESSURE RESPONSIVE VALVE
Filed Oct. 8, 1948     3 Sheets-Sheet 1
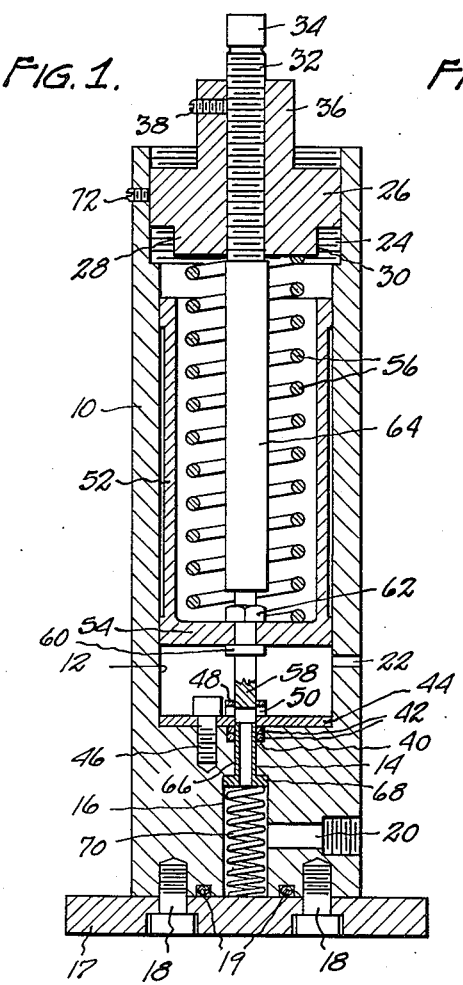
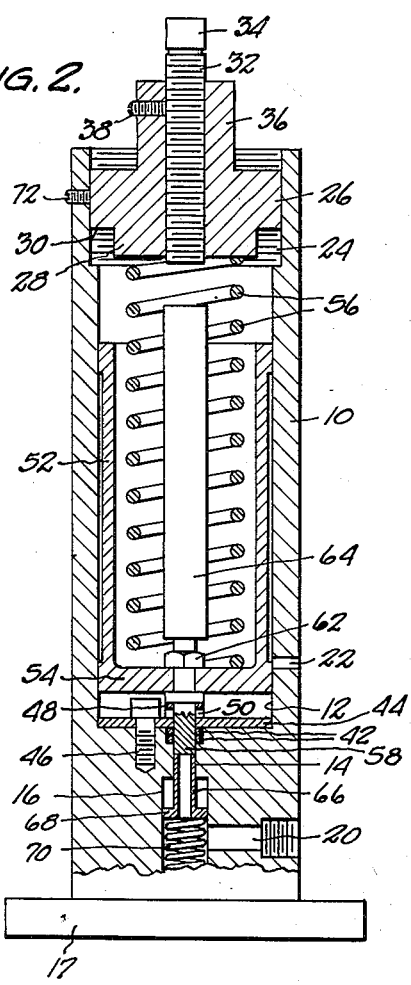
EDWARD C. FILSTRUP, JR.
INVENTOR.
BY Oltsch & Knoblock
ATTORNEYS.

April 1, 1952  E. C. FILSTRUP, JR  2,591,528
PRESSURE RESPONSIVE VALVE
Filed Oct. 8, 1948  3 Sheets-Sheet 2

EDWARD C. FILSTRUP, JR.
INVENTOR.

BY Altsch + Knoblock
ATTORNEYS.

April 1, 1952     E. C. FILSTRUP, JR     2,591,528
PRESSURE RESPONSIVE VALVE
Filed Oct. 8, 1948     3 Sheets-Sheet 3

EDWARD C. FILSTRUP, JR.
INVENTOR.

BY *Oltsch & Knoblock*

ATTORNEYS.

Patented Apr. 1, 1952

2,591,528

UNITED STATES PATENT OFFICE 2,591,528

PRESSURE RESPONSIVE VALVE

Edward C. Filstrup, Jr., St. Joseph, Mich., assignor to Armstrong Coalbreak Company, Benton Harbor, Mich., a corporation of Michigan Application October 8, 1948, Serial No. 53,491

1 Claim. (Cl. 137—53)

This invention relates to improvements in pressure responsive valves, and particularly to valves of this character for use in fluid systems having high operating pressures, that is, operating pressures in the order of 20,000 pounds per square inch or more.

The primary object of the invention is to provide a valve of this character which is inexpensive, small in size, light in weight, easy to manufacture and assemble, which does not require exceedingly close tolerance between parts, and which is effective for a long period of time as a seal for fluids at high pressures containing abrasive parts. A further object is to provide a pressure responsive valve wherein soft resilient sealing elements are interposed between a valve housing and a rigid valve element shiftable between a closed position engaging said sealing elements and an open position spaced from one sealing element, and wherein a protective member is shiftable to engage said last named sealing element when said valve element moves toward open position.

A further object is to provide a valve including a housing having a chamber and a passage communicating with an intermediate portion of said chamber, with a rigid valve element slidable in said chamber between positions respectively spanning and clear of said passage, annular seals mounted by said housing to encircle opposite ends of said element when in passage spanning position, and a follow-up member shiftable between a position encircled by one ring and an inoperative position when said valve element moves between open and closed position.

A further object is to provide a device of this character for use in high pressure fluid systems, having a valve shiftable in a housing between open and closed positions relative to a lateral housing port in response either to a predetermined pressure condition or to the direction of flow in the system, wherein seals of a character subject to destruction or damage when subjected to system pressure are utilized to prevent pressure leakage past the valve element in the closed position of the valve, and are so located and arranged as to be protected from damage when the valve is open.

Other objects will be apparent from the following specification.

In the drawing:

Fig. 1 is an axial sectional view of one embodiment of the valve shown in open position.

Fig. 2 is an axial sectional view of the valve in its closed position.

Figure 3:
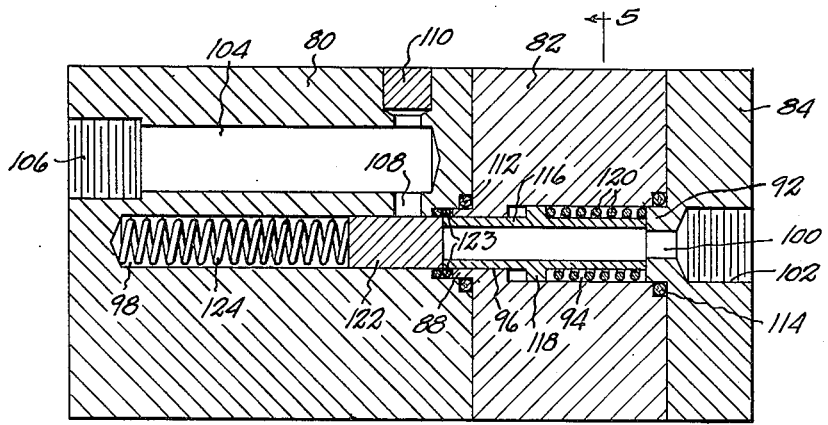
Fig. 3 is an axial sectional view of a check valve embodying this invention utilizing an internal protective sleeve, and shown in its closed position.

Referring to the drawings, and particularly Figs. 1 and 2 which illustrate the embodiment of the invention in a safety valve, the numeral 10 designates a valve body of cylindrical form having an elongated bore 12 extending axially therein from one end thereof and communicating with a reduced diameter concentric bore 14 intermediate its ends whose opposite end in turn communicates with a larger bore 16. A plate 17 is secured to the lower end of the casing 10 by securing screws 18, and an annular seal 19 seals the joint between these parts. A transverse port or passage 20 communicates with the bore portion 16. Another passage 22 extends through the housing wall adjacent the inner end of the large bore 12. The outer end of the bore 12 is internally screw-threaded at 24, and an externally screw-threaded cylindrical member 26 is threaded in the bore end portion 24 and is adjustable lengthwise therein. The cylinder 26 has a concentric reduced diameter inner end portion 28 defining an annular cavity 30. A set screw 32 is screw-threaded in an opening formed axially in the member 26 and extending entirely therethrough, whereby the head 34 of the set screw projects for ready accessibility. The outer end of the member 26 preferably terminates in a neck portion 36, and a set screw 38 is threaded in a lateral screw-threaded opening in said neck and adapted to bear against the set screw 32 to hold the same in selected adjustment in the member 26.

The reduced portion 14 of the bore is stepped at 40 to receive one or more O-rings or other annular sealing members 42 of the soft resilient material which is responsive and sensitive to and is deformable by fluid pressure to effect a seal between interfitting parts. A plate 44 is secured against the inner end wall of the bore 12 by means of securing screws 46. This plate has an inwardly projecting neck 48 formed thereon, and a plurality of lateral ports 50 are formed in the neck 48. The neck is formed concentric with the plate and the bore 10, and the passage therethrough is axially aligned with and of the same diameter as the bore portion 14. Thus it will be apparent that the inner marginal portion of the plate 44 at its lower surface forms a shoulder cooperating with the stepped portion 40 for the purpose of confining the O-rings 42 against axial displacement.

A cup-shaped or cylindrical member 52 is slidably mounted within the bore 10 with its closed end 54 positioned lowermost. A coil spring 56 is positioned within the cylinder 52 with its lower end bearing against the end wall 54, and its upper wall bearing against the end of the member 26. The coil spring 56 normally urges the cylinder 52 to the position shown in Fig. 2. The end wall 54 of the cylinder has a central aperture therein, and this aperture mounts a shaft 58 having a shoulder 60 bearing against the outer face of the end wall 54. The shaft mounts a retainer 62 bearing against the inner surface of the end wall 54, whereby the shaft is locked in fixed position to the cylinder. The shaft 58 includes an elongated portion 64 within the cylinder which is adapted to bear against the set screw 32, as illustrated in Fig. 1. The lower projecting end of the shaft 58 is of such length that when the upward movement of the shiftable unit, including the piston 52 and the shaft portion 64, is stopped by the engagement of the latter part with the set screw 32, the lower end of said shaft will extend only slightly into the sleeve 48 to permit communication between the sleeve ports 50 below its lower end, as shown in Fig. 1.

A sleeve 66 is slidable within the reduced portion 14 of the bore and has an enlarged flange 68 at one end slidable within the bore portion 16 and pressed against by a coil spring 70 whose opposite end bears against the plate 17. The sleeve 66 is of such length that when the flange 68 bears against the shoulder between the bore portions 14 and 16 as illustrated in Fig. 1, the upper end of the sleeve will enter the plate 44 below the lateral openings 50. In the closed position of the parts as illustrated in Fig. 2, it will be observed that the end of the shaft 58 bears against the end of the sleeve 66.

This valve is particularly suitable for use in a pressure system to prevent fluid pressures within that system from exceeding a predetermined maximum. The spring 56 is selected of a value to yield at a certain blow-off pressure, and this value or pressure yielding may be adjusted to a certain extent by controlling the compression of the spring through the longitudinal positioning of the member 26 within the housing. It will be observed that when the spring urges the members 54, 58 to the closed position of the valve, an effective seal is provided between the inlet 20 and the outlet 22 by the sealing ring or rings 42. In this arrangement the pressure acts directly against the end of the shaft 58 and the spring 70 urges the sleeve 66 against the end of the shaft 58. As the member 26 is adjusted lengthwise in the portion 24, the extent to which the shiftable parts may move in their open position is determined by the setting of the set screw 32. Thus it is possible in substantially all adjustments of the member 26 to cause the upper limit of travel of the members 52, 54 and 58 to remain constant by either projecting said screw inwardly or retracting it outwardly. This is accommodated in part by the annular groove 30 which receives the end of the cylinder wall 52 in the open position of the device when the member 26 is adjusted inwardly to substantially its full extent. The setting of the parts is fixed when made by means of the set screw 38 which locks said screw 32 in selected position in the member 26 and by set screw 72 in the casing 10 adapted to bear against the peripheral surface of the member 26.

In this form of the device it is desirable that the outlet port 22 be small enough to maintain a constant pressure in the chamber to prevent vibratory operation of the valve when the valve is opened. At the same time, the port 22 must be large enough to bleed off and avoid the action of pressure against the cylinder 52, 54 which would tend to fully open the valve due to the large area of the wall 54 compared to the area of the end of the shaft 58. The large ratio between the diameters of wall 54 and shaft 58 is desirable when pressure is to be relieved suddenly with a substantial pressure drop at a time when a predetermined maximum pressure is reached. It will be apparent, however, that if the valve is to be used for control purposes, the ratio of the areas of the wall 54 and the end of the shaft 58 should approach one to one.

It will be understood that in the operation of the device when a predetermined pressure is reached, sufficient when acting against the end of the shaft 58 to urge the parts 52, 54 against the pressure of the spring 56 toward the Fig. 2 position, the shaft will move sufficiently to open the bore 14 at the ports 50. The spring 70 will cause the sleeve 66 to follow the opening movement of the shaft 58 to the limit of its travel determined by the point at which the flange 68 engages the shoulder between the bore portions 14 and 16 of the device. In this position as illustrated in Fig. 1, the upper end of the sleeve will fit within the sealing ring 42 and project into the plate 44 for the purpose of protecting the sealing members 42 against the direct application of the fluid pressure thereagainst. Thus in all operative positions of the device, the sealing rings 42 will be protected against the direct application of the fluid under high pressure thereto, and a long effective life of the valve will be assured.

Figure 4:
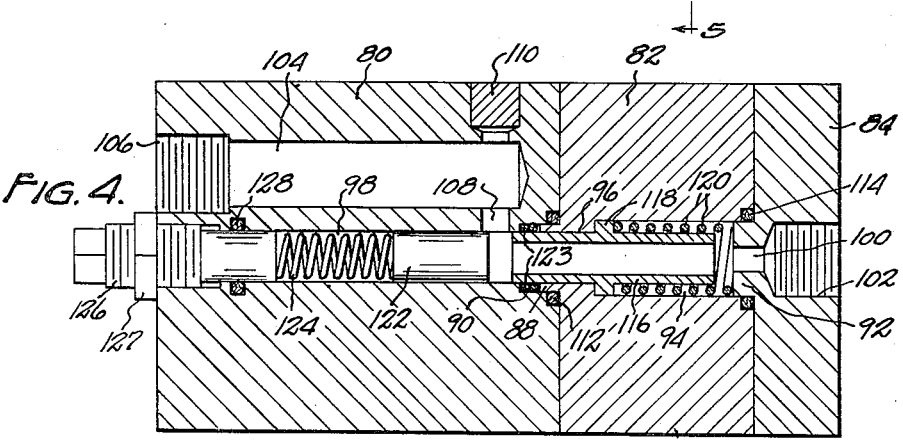
Fig. 4 is a view similar to Fig. 3, illustrating the check valve in its open position.
Figure 5:
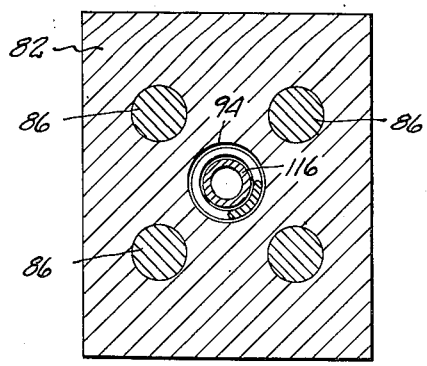
Fig. 5 is a transverse sectional view taken on line 5—5 of Fig. 3.

Another embodiment of the invention in the nature of a check valve is illustrated in Figs. 3, 4 and 5. This valve is formed of a pair of blocks 80 and 82, together with an end plate 84, which parts are secured together by means of bolts 86 extending longitudinally thereof. The block 82 terminates in a neck portion 88 which fits within a stepped socket or recess 90 in the block 80, said recess being of a greater depth than the length of the neck 88. The end plate is similarly provided with a neck 92 which fits within one end of a bore 94 in the block 82. The inner end of this bore is of reduced diameter at 96 and extends through the remainder of the block 82 and the sleeve 88. An elongated bore 98 of the same size as the bore portion 96 is formed in the block 80 in coaxial relation to and in communication with the socket 90 and terminates spaced from the opposite end of said block. The plate 84 has a bore portion 100 formed therein communicating with and of much smaller size than the bore 94 of the block 82, and this bore 100 communicates with a mouth 102 which is internally screw-threaded for the connection of a conduit therewith. The block 80 has a bore 104 therein substantially parallel to and alongside the bore portion 98 open at its outer end at a mouth 106 with which a conduit is adapted to be connected and terminating at its inner end in spaced relation to the parting plane between the blocks 80 and 82. A transverse bore 108 places the bores 98 and 104 in communication at a point spaced slightly from the inner end of the bore portion 90. The outer end of the transverse bore 108 is sealed or closed by a suitable plug 110. The joint between the blocks 80 and 82 is sealed as by means of an O-ring 112, and the joint between the block 82 and the plate 84 is sealed as by means of an O-ring 114.

An elongated sleeve 116, whose outer diameter is such as to have a snug sliding fit within the bore portions 98 and 96, is mounted within the block 82 and has a shoulder 118 intermediate its ends which fits snugly within the bore portion 94. A coil spring 120 encircles one end of the sleeve 116 bearing at one end against the end of the neck 92 of the plate 84, and at its opposite end against the flange 118 of the sleeve 116. A solid cylindrical bar or member 122 fits slidably within the bore portion 98 and is urged in the direction of the sleeve 116 by the coil spring 124. The coil spring 124 is of greater strength than the coil spring 120 and, in the static pressure condition of the device, serves to urge the members 116 and 122 to the position illustrated in Fig. 3, wherein the cylinder 122 spans the transverse opening 108 into the bore 98, it being observed that the inner or right-hand end of the member 122 projects beyond the bore 98 and into the enlarged socket 90 for engagement with sealing means, such as the O-ring or rings 123.

The closed or static position of this valve is shown in Fig. 3 with an effective seal established within the valve between the mouths of ports 102 and 106. This same condition continues during pressure conditions at all times when the pressure within the line communicating with the port 106 exceeds the pressure within the part of the line communicating with the port 102.

However, in any case in which the pressure in the line communicating with the port 102 exceeds the pressure in the line communicating with the port 106 to an extent sufficient to overcome the spring 124, that pressure will serve to move the member 122 to the position illustrated in Fig. 4, where the member 122 is shifted inwardly to establish or permit communication between the port 102 and the transverse port 108 through the interior bore of the sleeve 116. Observe that as the pressure is exerted by the fluid against the right-hand or inner end of the member 122, the spring 120 is permitted to come into play for the purpose of shifting the sleeve 116 to the left with its flange 118 bearing against the shoulder between the portions 96 and 94 of the bore. This movement is sufficient to permit the inner or left-hand end of the sleeve 116 to pass through the sealing rings 123, but is terminated short of the transverse port 108. Consequently, the sealing members 123 are effectively protected against the direct application of fluid under high pressure thereto. It will be apparent, therefore, that this valve provides a very simple device responsive to fluid pressure for opening the valve in the event the direction of flow of fluid in the system is such that the port 102 constitutes the inlet of the valve. When the direction of flow is reversed, however, so that the port 106 becomes the inlet, the pressure upon the right-hand end of the valve element 122 is relieved to a point permitting the spring 124 to shift the valve element to the closed position in Fig. 3.

In the event it is desired to adjust the valve to respond to a different fluid pressure, the valve may be constructed as shown in Fig. 4 wherein a plug 126 is threaded in a screw-threaded end portion of bore 98 and bears against the outer end of spring 124. A lock nut 127 may be employed to hold the plug in selected adjustment. A sealing ring 128 may be used to provide a seal between the plug and the valve body.

Figure 6:
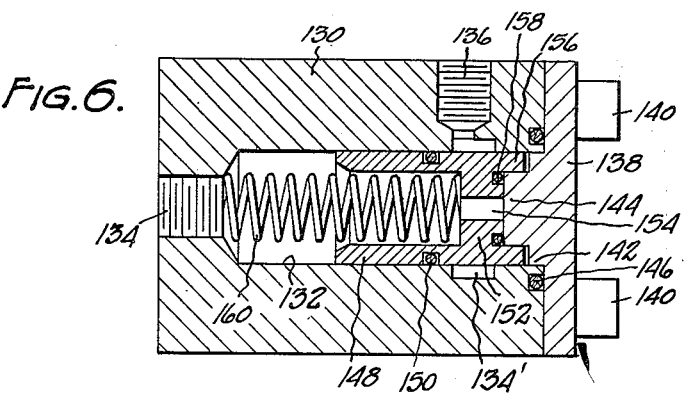
Fig. 6 is an axial sectional view of a check valve constituting another embodiment of the invention and utilizing a face sealing member, said valve being in its closed position.
Figure 7:
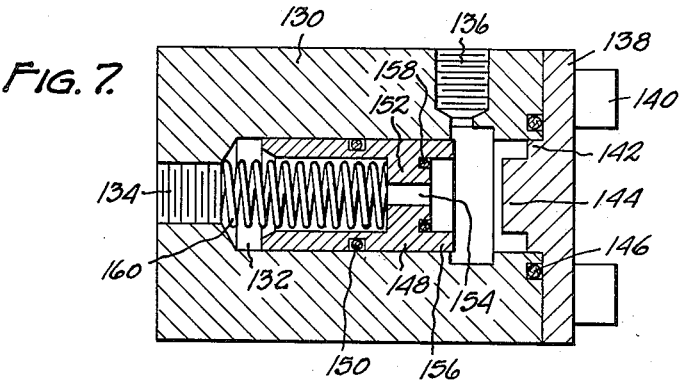
Fig. 7 is an axial sectional view similar to Fig. 6, illustrating the valve in its open position.

Another embodiment of the invention in the form or nature of a check valve is illustrated in Figs. 6 and 7. In this form the valve has a body 130 preferably formed of a solid block of metal, which has a central or axial bore 132 therein communicating with a port 134 of smaller cross-sectional size than said bore. At a point adjacent but spaced inwardly from one end of the bore 132 is provided a circumferential enlargement 134' with which a lateral port 136 communicates. A plate 138 is secured to the end of the block 130 at which the bore 132 opens by means of suitable securing members 140. The plate 138 has a stepped inner projection, including a bore 142, which fits snugly within the end portion of the bore 132, and a reduced inner projection 144. A circumferential groove is formed in the end of the body 130 to receive an annular seal, such as an O-ring 146, to seal the joints between the parts. A valve element 148 of substantially cup-shaped form fits snugly and slidably within the bore 132 and is provided with a circumferential groove intermediate its length at a portion which is always at the same side of the enlargement 134' of the bore, namely to the left as shown, which receives an annular sealing member 150, such as an O-ring. The end wall 152 of the valve 148 has a port or opening 154 formed substantially centrally therein. A cylindrical projection 156 is formed on the member 148 to project beyond the wall 152 toward the right, as illustrated in the drawing, the said cylindrical projection being of such size that it fits snugly and slidably around the central projection 144 upon the end plate 138. An annular groove is formed in the wall 152 with its outer wall preferably forming a continuation of the inner wall of the cylindrical projection 156, and an annular sealing member, such as an O-ring 158, is seated in said groove and adapted to bear against the face of the projection 154 when the valve is in its closed or sealed position illustrated in Fig. 6. A coil spring 160 is provided in the device with one end thereof bearing against the wall 152 of the valve element, and its opposite end bearing against the shoulder in the device formed between the port 134 and the bore 132.

The static pressure position of the parts is illustrated in Fig. 6 in which it will be observed that the valve member 148 is urged to a position in which a seal is effected between the wall 152 and the plate 144 by the O-ring 158. In this position of the parts the valve element completely spans the enlargement 134' of the bore, and the parts are closed effectively. The parts continue to remain in their closed position during such time as pressure conditions exist within the device which entail the flow of liquid in a direction from the port 134 to the port 136. Observe in this connection that the O-ring 150 serves to prevent any leakage around the valve element. When the direction of flow of fluid in the system is reversed so that the port 136 becomes the inlet, a pressure leakage may occur past the cylindrical projection 146 into the space 162 between the end wall of the cylindrical projection 156 and the shoulder at the inner end of the plate part 162. This pressure builds up to a valve sufficient to move the valve element 148 against the action of the spring 160, and thereupon moves the valve element 148 to the Fig. 7 position, in which the end of the cylinder 156 has moved to open the enlargement 134' so that fluid may pass from the port 136 into the enlargement 134', past the inner end of the member 148, and thence be exhausted through the bore 154 for outlet at the port 134.

It will be observed in this connection that when the valve moves toward its open position, the O-ring 158 is exposed to fluid pressure in the system. However, it will be observed further than the initial differential pressure, serving to move the valve to the left toward open position, is only a small differential pressure even though the static pressure in the device may be very high. This low differential pressure avoids damage to the O-ring or other seal 158 in the initial action. When the valve has become fully open, the flow of fluid through the device is through the bore 154 in the center of the end wall 152 of the valve element, thus limiting the pressure exerted at the O-ring 158 to any current pressure which does not damage the ring by extrusion or the like. Observe also in this connection that the O-ring being seated at an inner corner and at the greatest possible distance from the bore 154, is protected from the direct flow path of the fluid around the cylindrical extension 156 to the bore 154.

Figure 8:
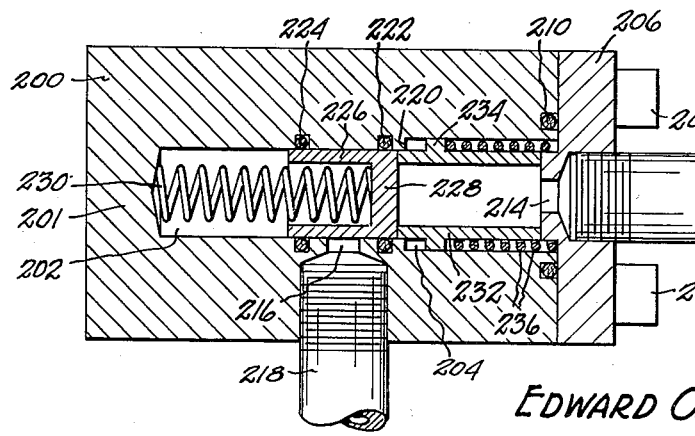
Fig. 8 is an axial sectional view of another embodiment of the invention utilizing an internal protective sleeve, illustrating the valve in its closed position.

Another embodiment of the invention for use as a check valve is illustrated in Fig. 8, wherein the valve has a body 200 provided with a longitudinal bore 202 extending for the major portion of its length terminating in spaced relation to one end of the block 200 and opening at the other end of said block at an enlarged diameter bore portion 204. An end plate 206 is secured to the body 200 by securing means 208, and a seal is provided between said end plate and the body, which seal is here illustrated as an O-ring seated in a groove formed in the end of the body 200. A conduit 212 is connected with the plate 206 at a port 214. A lateral port 216 is formed in the small diameter portion 202 of the bore spaced longitudinally from the large diameter bore portion 204, and a conduit 218 is connected with said port. It will be observed that a shoulder 220 is formed within the body at the junction of the small bore part 202 and the large bore part 204. A circumferential groove is formed within the body 200 between the shoulder 220 and the port 216, and an annular sealing member, such as an O-ring 222, is mounted in said groove. A second circumferential groove is formed in the body 200 between the port 216 and the closed end of the body 200 and receives an annular sealing member, such as an O-ring 224. The two O-rings 222 and 224 are preferably located adjacent to the port 216. A valve element, which may be of cup-shaped form having a cylindrical wall 226 and an end wall 228, is mounted within the small bore portion 202 for free sliding movement and is normally urged in the direction of the end plate 206 by a coil spring 230 bearing at one end against said valve element and bearing at its opposite end against the end wall 201 of the body 200. The axial length of the valve element, that is, the length of its longitudinal wall 226, is greater than the spacing between the sealing members 222 and 224, so that in the closed position of the valve, said valve element may span and be encircled by said sealing elements 222 and 224, as illustrated.

A follower sleeve 232, whose outer diameter is substantially equal to the diameter of the bore portion 202, fits slidably within said bore portion 202 at its inner or leading end portion. At an intermediate part thereof the sleeve 232 has an enlarged laterally projecting flange 234 of a size to have a free sliding fit within the enlarged bore portion 204. A coil spring 236 bears against the flange 234 at one end and against the end plate 206 at its opposite end to normally urge the sleeve 232 against the end wall 228 of the valve element. It will be understood that the spring 236 is of less strength than the spring 230.

The static pressure position of the parts is illustrated in Fig. 8 in which it will be observed that the spring 230 overcomes the spring 236 and urges the parts to the position shown with the valve element 226 spanning the lateral port 216 with its opposite end portions fitting within and encircled by the seals 222 and 224. The parts remain in this position, also under pressure conditions where the direction of flow in the fluid system is such that line 218 constitutes the supply line, and line 212 constitutes the outlet line.

When the direction of flow of fluid in the system is reversed so that the line 212 becomes the inlet, it will be apparent that the application of fluid pressure against the end wall 228 of the valve element, when sufficient to overcome the pressure of the spring 230, will shift said valve element to at least partly open the lateral port 216. The fluid pressure will maintain the valve in this open position as long as this direction of flow continues. The movement of the valve element to open position disengages the valve element with the seal 222. As this opening movement of the valve element occurs, the spring 236 comes into play, however, and urges the sleeve 232 in a direction to follow the valve to the limit permitted by engagement of the sleeve flange 234 with the shoulder 220. The sleeve is of such length that the portion projecting inwardly from the flange 234 is of a length greater than the spacing between the seal 222 and the shoulder 220 so that said sleeve enters said seal and thereby serves to protect said seal.

Observe in this construction that there is no possibility of the development of a pressure condition between the valve element and the closed end 201 of the housing 200 because of the seal 224. Thus the pressure of the spring 230 is free to act upon the valve element at all times and, in a case where the direction of flow in the system reverses so that the line 218 becomes the inlet line, the spring 230 is free to act to urge the valve element to the sealing position shown.

While various embodiments of the invention which I prefer have been illustrated and described herein, it will be understood that changes in the construction of the valve may be made within the scope of the appended claim without departing from the spirit of the invention.

I claim:

A safety valve adapted for connection with a fluid system under high pressure, comprising a body having an elongated pasage therein open at an inlet port and an outlet port spaced lengthwise thereof, a plunger shiftable in said passage and having a sealing position and an open position, a circumferential seal carried by said body between said ports and engageable with said plunger in its closed position, a spring pressed sleeve shiftable in said passage toward said plunger to a seal engaging and protecting position when said plunger is in open position, and a spring maintaining said plunger in closed position during normal operating conditions in said system and yieldable upon application of system pressures exceeding a predetermined value, said passage having a portion of reduced cross-sectional size between and spaced from said ports, and an apertured sleeve communicating with said reduced passage portion, said plunger being shiftable to a position opening said sleeve apertures in its open position.

EDWARD C. FILSTRUP, Jr.

REFERENCES CITED

The following references are of record in the file of this patent:

UNITED STATES PATENTS

| Number | Name | Date |
|---|---|---|
| 382,469 | Hawthorn | May 8, 1888 |
| 948,404 | Webb | Feb. 8, 1910 |
| 969,803 | Pollock | Sept. 13, 1910 |
| 1,293,858 | Mills | Feb. 11, 1919 |
| 1,385,019 | Mathieu | July 19, 1921 |
| 1,656,670 | Greenhouse | Jan. 17, 1928 |
| 1,841,029 | Hamilton | Jan. 12, 1932 |
| 2,124,374 | Mulloy | July 19, 1938 |
| 2,251,275 | Ernst | Aug. 5, 1941 |
| 2,292,294 | Rotter | Aug. 4, 1942 |
| 2,360,733 | Smith | Oct. 17, 1944 |
| 2,371,793 | Bourland | Mar. 20, 1945 |